July 10, 1928.

Re. 17,030

L. S. GUNDERMAN

SAFETY DEVICE FOR CLOTHES WRINGERS

Original Filed Sept. 24, 1923

WITNESSES:

Florence M. Abbott.

Charles B. Mellagan

INVENTOR.

Lester S. Gunderman

Reissued July 10, 1928. Re. 17,030

UNITED STATES PATENT OFFICE.

LESTER S. GUNDERMAN, OF PITTSBURGH, PENNSYLVANIA.

SAFETY DEVICE FOR CLOTHES WRINGERS.

Original No. 1,518,919, dated December 9, 1924, Serial No. 664,337, filed September 24, 1923. Application for reissue filed March 20, 1926. Serial No. 96,365.

This invention relates to a safety device for clothes wringers and the like and relates particularly to a feeding means therefor whereby articles of clothing can be passed through the wringer without danger to the operator and without any necessity for the operator bringing his hands into contact with the rolls.

The invention has for one of its principal objects to provide a feeding mechanism of simple construction which can be conveniently operated and which may be easily applied to power driven wringers of the kind now commonly employed in connection with domestic washing machines and elsewhere.

The invention has for a further object to provide a feeding device having a movable feed plate wherein the feed plate is housed when in inoperative position so that it will not become engaged with the clothes being drawn into the rolls and it will not tear the clothes as they are drawn in through the rolls.

A further important object of the invention is to provide a device of this kind wherein the feed plate is resiliently supported along its feeding edge so that it will function to yieldably hold the clothes against the upper roll over which it is drawn into the pass between the rolls and which can yield to the thickness of the material being passed through the wringer.

The nature of the invention may be readily understood by reference to the accompanying drawing which illustrates a preferred embodiment of my invention and in which.

Referring more particularly to the drawings, 7 designates the upright frame members of a wringer, 8 are the cross pieces connecting the uprights, 9 and 10 are the usual upper and lower rolls respectively, and these are arranged to be driven from one end in any well known manner. The usual guard plates provided at each end of the rolls are designated 11.

Figure 1:
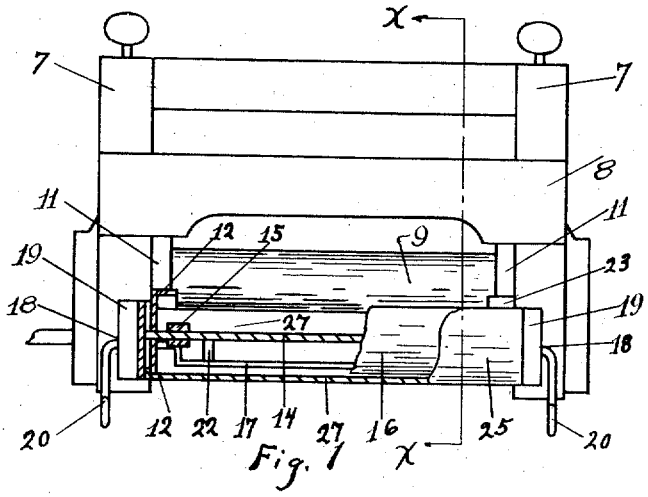
Figure 1 is a front elevation of a wringer frame and rolls of common construction showing my invention applied thereto, part of the structure of the feeding device being broken away to show the operating parts.
Figure 2:
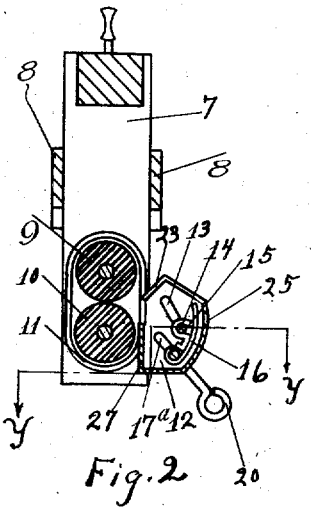
Figure 2 is a transverse vertical section in the plane of line $x—x$ of Figure 1.
Figure 3:
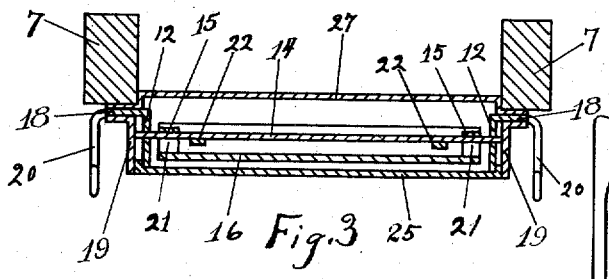
Figure 3 is a horizontal section in the plane of line $y—y$ of Figure 2.
Figure 5:
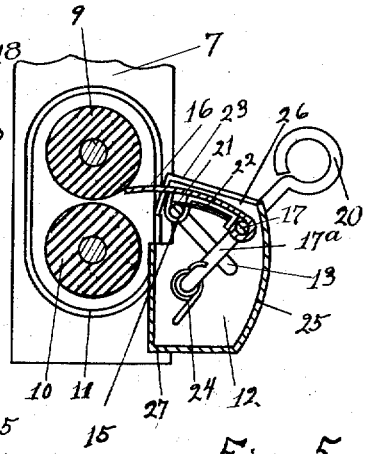
Figure 5 is a view similar to Figure 4 showing the feed plate in operative position.
Figure 4:
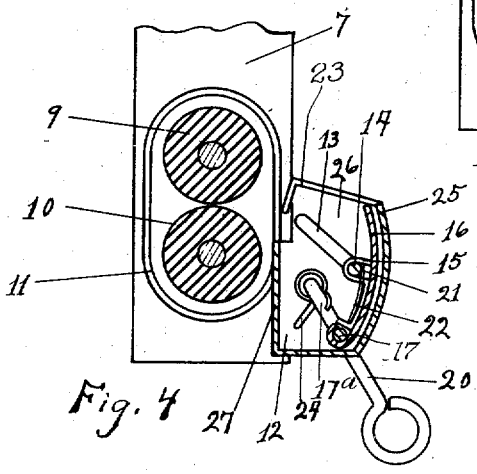
Figure 4 is an enlarged section also taken in the plane of line $x—x$ of Figure 1 showing the parts in greater detail and showing the feed plate in inoperative position.

My invention comprises a structure adapted to be secured directly to the wringer frame, and has a pair of side plates 12 which are secured to the respective uprights 7. In each of the side plates 12 is a diagonally disposed slot 13, this slot extending upwardly and inwardly, as best shown in Figures 4 and 5. Received within the slots 13 of the respective plates 12 are the opposite ends of a guide bar 14 which extends across the distance between the two plates 12. Extending across between the two side plates 12 there is also a feed plate 16 having keepers or yokes 15 secured to the inner face thereof. The cross bar 14 passes through the keepers or yokes 15 so that the plate is loosely connected with the cross bar.

The lower edge of the feed plate 16 is loosely turned over the edge of a cross bar 17, which cross bar has arms $17^a$ at each side thereof. The arms $17^a$ are outwardly curved at their inner ends and pass through bearings 18 in the side plates 19, which are located immediately outside the plates 12, and are forwardly bent outside the plates 19 to provide operating handles 20. When the operating handles 20 are raised from the position shown in Figure 4 to the position shown in Figure 5 the feed plate 16 is rocked through a corresponding arc, and the plate is guided in its movement through this arc by the cross bar 14. By reason of the keepers or yokes 15 being relatively large with respect to the cross bar 14, the plate 16 has considerable freedom of movement, transversely, relative to the cross bar 14. In order to resiliently urge the plate 16 outwardly away from the bar 14 leaf springs 22 are provided on the bar and the outer ends of these springs bear against the inner face of the plate 16 as shown, thereby tending to urge the uppermost or forwardmost edge of the plate 16 outwardly. When the plate is rocked as hereinbefore explained from the position shown in Figure 4 to the position shown in Figure 5, the forwardmost edge of the plate can yield downwardly when it comes in contact with the upper roll. If clothes are being fed through the wringer, the edge of the plate 16 may be depressed an amount equal to the thickness of the clothes so that the clothes will be resiliently held against the lower surface of the upper roll and drawn by the movement of this roll into the pass between the two rolls.

One or more springs 24 may be secured about the laterally turned portions of the arms 17[a], with one end of the spring hooked to the arm 17[a] and the other end of the spring hooked into the plate 12 for resiliently urging the feed plate from the extended or operative position as shown in Figure 5 to the retracted or inoperative position of Figure 4.

Secured to the supporting side plates 19 is a curved vertically extending guard plate 25, and the curvature of this plate conforms substantially to the curvature of the feed plate 16. When the feed plate is in its inoperative or retracted position it lies within the plate 25 and closely adjacent thereto, as clearly shown in Figure 4. The width of the plate 25 is only slightly greater than the width of the plate 16. The plate 25 encloses all of the operating parts of the feeder and prevents clothes which are being drawn through the wringer from bearing against the plate 16 and prevents the clothes from being torn by being pulled into contact with any of the operating parts of the feeder mechanism. The mechanism is further guarded and enclosed by housing plate 27 having a vertical portion and a horizontal portion, the former portion forming a back wall for the feeder and the latter forming a bottom closure plate for the feeder. Guards 23 may be extended forwardly from each of the side edges of the plate 25. These guards 23 have a downwardly turned flange portion at their lower edge adapted to engage with shoulders on opposite side edges of the plate 16 to limit the forward movement of the plate 16 so that under no conditions can the plate be drawn into the rolls.

When the feed plate is in the retracted position shown in Figure 4 there is a pocket or trough 26 formed by the several parts and into this trough the ends of the clothes to be wrung are placed. The handles 20 are then raised, and the forwardmost edge of the feed plate 16 carries the ends of the clothes so positioned against the lower surface of the upper roll. The clothes thus brought into contact with the lower surface of the upper roll are drawn into the pass between the rolls. Where the clothes are not bunched, or where the material is relatively thin the plates 16 will yield only slightly, but where the clothes are thick or are considerably bunched, the plate 16 can be pressed downwardly against the pressure exerted by springs 22 to an extent sufficient to permit such clothes to be dragged or pulled through the wringer.

The feeder as herein described is simple to operate. Inasmuch as it is only necessary that the ends of the clothes be laid over top of the guard plate 25 there is no necessity for the operator to bring his fingers anywhere near the pass between the rolls and consequently there is no danger to the operator in the use of a wringer so equipped. In view of the fact that the plate 16 can be easily worked by the handles 20 and inasmuch as this plate will function to move the clothes into the pass between the rolls, the operation of wringing can be quickly performed so that no additional time is consumed in using a device of this kind.

In the accompanying drawings and description I have illustrated and described a preferred embodiment of my invention but it will be understood that the invention may be otherwise embodied and that various changes and modifications may be made in the structure thereof within the contemplation of my invention and under the scope of the following claims.

I claim:

1. A feeding device for wringers including a vertically arranged guard plate, and an arcuately movable feed plate associated therewith and adapted to be rocked toward and away from the wringer to which the device is attached, said device being adapted to normally lie adjacent the guard plate when it is in inoperative position.

2. A feeding device for wringers including a pair of spaced apart side members, a feed plate supported by the side members and arcuately movable between them toward and away from the wringer to which the device is applied, and a substantially vertical guard plate connecting the side members, said feed plate normally lying closely adjacent the guard plate between the guard plate and the wringer to which the device is attached.

3. A feeding device for a clothes wringer comprising a pair of spaced apart members adapted to be mounted on a wringer, a rod extending between the two side members, having arms thereon pivotally supported in the side members, at least one of said arms having an operating extension thereon and by means of which said rod may be swung in an arc, a feed plate loosely supported on the rod, guiding means for the feed plate, a resilient means operatively interposed between the guiding means and the feed plate.

4. A feeding device for wringers comprising a pair of side members adapted to be carried by the wringer, a rod extending between the side members, an arm at each end of the rod rotatably supported in the side members, a feed plate loosely supported on the rod, guiding means for the feed plate, a resilient element operatively interposed between the feed plate and the guiding means for yieldably permitting a slight relative movement between the feed plate and the guide means, and a vertically disposed guard plate extending across the front of the wringer and connecting said side members, said feed plate being adapted to normally lie between said guard plate and the wringer to which the device is attached and closely adjacent the former.

5. A feeding device for a wringer comprising bracket members adapted to be disposed at each side of a wringer frame, said bracket members having diagonally disposed guides therein, which guides are directed upwardly and inwardly toward the wringer to which the device is attached, a feed plate between the bracket members and movable toward and away from the wringer on which the device is carried, a guide bar carried on the plate and slidably engaged in the guides of said bracket members, resilient means interposed between the guide bar and the feed plate for yieldably permitting a slight relative movement between the guide bar and the plate, and an operating means connected with the feed plate.

6. A feeding device for wringers comprising bracket members adapted to be disposed at each side of a wringer frame, said bracket members having diagonally disposed guides therein which are directed upwardly and inwardly toward the rolls of the wringer to which the device is secured, a feed plate between the bracket members, a guide bar connected with the feed plate and engaged in said guides, a spring operatively interposed between the guide bar and the feed plate, an operating member connected with the feed plate, and a guard plate extending between the bracket, said feed plate being adapted in one of its positions to lie closely adjacent the guard plate and between the guard plate and the wringer to which the device is applied.

7. A feeding device for clothes wringers comprising side members adapted to be mounted on a wringer frame, said side members having slots therein, a transverse guide bar freely slidable along the slots, a feed plate resiliently supported along the guide bar and means pivotally carried on the side members for effecting a movement of the feed plate toward and away from the rolls of a wringer to which the device is attached.

8. A feeding device for clothes wringers comprising side members adapted to be mounted on a wringer frame, said side members having slots therein, a transversely extending guide bar having its ends slidably received in the slots, a feed plate resiliently supported on the guide bar, means pivotally carried on the side members for effecting a movement of the plate toward and away from the rolls of a wringer to which the device is attached, and a vertical guard plate extending between the side members in front of the feed plate when the latter is in a position most remote from the wringer rolls.

9. A feeding attachment for clothes wringers comprising a pair of side supporting members adapted to be secured to a wringer frame, a vertical guard plate connecting said supporting members, an oscillatory feeding plate mounted between the side supporting members, means for imparting an oscillatory movement to the feed plate, and means for resiliently supporting that edge of the feed plate which is nearest the rolls of the wringer to which the device is attached, said feed plate being adapted to normally lie closely adjacent the guard plate and between the guard plate and the wringer to which the device is attached.

10. An attachment for wringers comprising a housing having a bottom plate, side supporting members and a front guard plate, and an arcuately movable feed plate within the housing, said feed plate normally being positioned adjacent the guard plate.

11. An attachment for wringers comprising a housing having a bottom plate, side supporting members and a front guard plate, an arcuately movable feed plate within the housing, said feed plate being movable from a normal position adjacent the guard plate toward the wringer to which the device is attached, said feed plate having that edge which approaches closest to the wringer resiliently supported and guided.

12. An attachment for a clothes wringer having frame members and presser rolls journaled in said frame members, comprising side members mounted on said frame members, a bell crank having an operating member journaled in said side members, a feed plate with its lower edge hinged to the bell crank and having link members mounted on its ends, a guide bar with its ends mounted in guide slots in said side members and passing through the link members, the upper longitudinal edge of said feed plate being arranged to engage clothes and force the same between said presser rolls, a member placed between the feed plate and the presser rolls and fastened to the side members to prevent the clothes from passing below the feed plate and the presser rolls when being acted upon by the said feed plate, and a cover plate with its ends fastened to the side members forming a guard over said feed plate and protecting said feed plate when in an inoperative position.

13. An attachment for a clothes wringer having a frame and presser rolls journaled therein, comprising side members mounted on the frame, said side members having elongated slots, a guide bar freely slidable in an upward and downward movement in said slots, a bell crank journaled in said side members, and the outward extended ends thereof forming handles, a feed plate having its lower edge hinged to said bell crank, link members secured to said feed plate, said guide bar being retained at the outward ends of said link members by springs fastened to said feed plate to resiliently hold the operative edge of the feed plate when in contact with the presser rolls and in feeding different thicknesses of clothes to the presser rolls, said side members at their upper edges being provided with inwardly formed flanges for preventing said feed plate from being drawn in between the presser rolls when in contact with the upper presser roll, a member placed between the feed plate and the presser roll and fastened to the side members to prevent the clothes from passing below the feed plate and presser rolls when being acted upon by said feed plate, springs one end of each being fastened to the bell crank and the other ends to the said side members to automatically move the feed plate to its normal resting position, and a cover plate with its ends fastened to the side members forming a guard over said feed plate and protecting said feed plate when in a normal resting position.

14. An attachment for a clothes wringer having a frame and presser rolls journaled in said frame, comprising side members mounted on said frame, a bell crank having an operating member journaled in said side members, a feed plate with its lower edge hinged to the bell crank and having link members mounted on its ends, a guide bar with its ends mounted in guide slots in said side members and passing through the link members, the upper longitudinal edge of said feed plate being arranged to engage clothes and force the same between said presser rolls, stops positioned on said side members for preventing the upper edge of said feed plate from being forced in between the presser rolls, springs, one end of each being fastened to said bell crank, their other ends being fastened to the end members for automatically moving said feed plate to an inoperative position, a member placed between the feed plate and the presser rolls and fastened to the side members to prevent the clothes from passing below the feed plate and presser rolls, and a cover plate with its ends fastened to the side members forming a guard over said feed plate and protecting said feed plate when in an inoperative position.

15. An attachment for a clothes wringer having a frame and presser rolls journaled therein, comprising side members mounted on the frame, a bell crank journaled in said members, a feed plate with its lower edge hinged to the center portion of said bell crank and having link members on its ends, a guide bar with its ends mounted in guide slots in said side members and passing through the link members, springs fastened to the feed plate to hold the guide bar at the farthest end of said link members yieldingly holding the feeding edge of the feed plate, the upper longitudinal edge of said feed plate being arranged to engage clothes and force the same between said presser rolls, springs, one end of each being fastened to said bell crank, their other ends being fastened to the side members to move said feed plate to inoperative position, a member placed between the feed plate and the presser rolls and fastened to the side members to prevent the clothes from passing below the feed plate and presser rolls when being acted upon by said feed plate, and a cover plate with its ends fastened to the side members forming a guard over said feed plate and protecting said feed plate when in an inoperative position.

In testimony whereof I affix my signature.

LESTER S. GUNDERMAN.